United States Patent [19]

Bortolini

[11] Patent Number: 5,105,293

[45] Date of Patent: Apr. 14, 1992

[54] DIFFERENTIAL OPTICAL SIGNAL TRANSMISSION USING A SINGLE OPTICAL FIBER

[75] Inventor: James R. Bortolini, Westminster, Colo.

[73] Assignee: AT&T Bell Laboratories, Murray Hill, N.J.

[21] Appl. No.: 591,920

[22] Filed: Oct. 2, 1990

[51] Int. Cl.[5] .......................................... H04B 10/00
[52] U.S. Cl. .................... 359/154; 359/188; 359/195
[58] Field of Search .............. 455/617, 618, 619, 612, 455/608, 606, 607; 370/3, 1; 350/96.15

[56] References Cited

U.S. PATENT DOCUMENTS

| | | |
|---|---|---|
| 4,316,141 | 2/1982 | Adolfsson et al. ................. 455/617 |
| 4,506,153 | 3/1985 | Ohno .................................. 250/227 |
| 4,764,984 | 8/1988 | Franke et al. ....................... 455/619 |
| 4,821,108 | 4/1989 | Barbagelata et al. .............. 358/282 |
| 4,878,726 | 11/1989 | Fatehi ............................ 350/96.15 |

FOREIGN PATENT DOCUMENTS

| | | | |
|---|---|---|---|
| 2537364 | 6/1984 | France ................................... 370/3 |
| 0119544 | 9/1981 | Japan ..................................... 370/3 |
| 0181245 | 11/1982 | Japan ..................................... 370/3 |

OTHER PUBLICATIONS

"Product Spotlight", *Fiberoptic Product News*, vol. 5, No. 6 (Jun., 1990), p. 42.
T. E. Bell "Light that Acts Like 'Natural Bits'", *IEEE Spectrum*, vol. 27, No. 8 (Aug. 1990) pp. 56–57.

*Primary Examiner*—Curtis Kuntz
*Assistant Examiner*—Kinfe-Michael Negash
*Attorney, Agent, or Firm*—David Volejnicek

[57] ABSTRACT

In an optical differential signal transmission system, both the optical signal and its complement are transmitted via a single optical fiber, by using wavelength-division multiplexing. In a multipoint transmission system, tri-stateable differential optical signal transmitters and receivers capable of discerning tri-state differential optical signals are used, to allow a plurality of signal sources to share the same optical signal transmission path on a time-division multiplexed basis.

5 Claims, 4 Drawing Sheets

INPUT $T_X$ $T_X$ $R_X$ $R_X$

OUTPUT

DIFFERENTIAL OPTICAL SIGNAL TRANSMISSION USING A SINGLE OPTICAL FIBER

TECHNICAL FIELD

This invention relates to differential-signal transmission arrangements and to optical-signal transmission arrangements.

BACKGROUND OF THE INVENTION

Standard point-to-point digital optical data links have a single light source which is turned on and off to send a "1" or "0" through an optical fiber to a receiver. Because of signal level variations, modal or chromatic dispersion in light transport, and other sources of loss and distortion, most of these data links use signal conditioning or encoding to ensure recovery of the original waveform. Some common requirements for such data links include a "ones density" to provide regular bit transitions, and near 50 percent duty cycle and receivers with automatic gain control to recover data over a wide variation of incoming optical signal levels. Even when such methods are used, some pulse-width distortion or bit errors can occur.

In multipoint optical communication systems, such as optical backplanes, each optical path is shared among a number of optical signal sources on a time-division multiplexed basis. In such systems, only one of many sources can typically be allowed to transmit light into the shared path at any given time. But conventional encoding and conditioning techniques typically involve continuous activity on the path, i.e., continuous transmissions by every signal source into a fiber. Consequently, no encoding of data is used in multipoint systems, and therefore no fixed duty cycle is guaranteed. Furthermore, such systems cannot normally use level-detecting receivers, since all of the possible transmitters may have different transmitted power levels, and edge detection is used instead at the receiver to recover the original transmitted waveform.

Although edge-detecting receivers have been shown to work in multipoint systems, they do have drawbacks. The overall sensitivity of an edge detection receiver is about 3 dB less than a comparable A.C.-coupled design. Because activity is bursty in nature, significant pulse-width distortion is seen in the recovered data stream. This distortion, and the use of positive feedback in the edge detection receivers, limits the maximum usable bit rate of such systems. Finally, there is no conventionally way to distinguish between transmission of a string of zeroes and no transmission of data at all. This may complicate system design.

Differential signal transmission, also known as balanced signal transmission, is a technique wherein both a pulse signal, e.g., digital binary signal, which is representative of an input signal, and a complement of the pulse signal—a signal that has the opposite signal magnitude, such that the sum of the simultaneous magnitudes of the two signals at all times is a constant—are transmitted by a transmitter to a receiver. For example, the transmitted pulse signal may alternate between magnitudes of one and zero (i.e., on and off) and its complement will respectively alternate between magnitudes of zero and one. Alternatively, the pulse signal may alternate between magnitudes of one and minus one (i.e., positive and negative) and its complement will respectively alternate between magnitudes of minus one and one. The receiver then determines the duration and value of the input signal from the instantaneous relative magnitudes of the received signal and its received complement. The advantages of differential signal transmission over other signal transmission and detection techniques are known and recognized in the art. They include enhanced immunity to signal noise, distortion, and dispersion, and enhanced sensitivity and speed of detection.

The differential signal transmission technique has been widely used to transmit electrical signals, using two electrical conductors—one for transmitting the signal itself and the other for transmitting the signal's complement. Recently, application of this technique to optical transmissions has been proposed. For example, U.S. Pat. No. 4,316,141 proposes the use of two side-by-side optical conductors, fibers, to transmit an optical signal and its complement. And U.S. Pat. No. 4,764,984 proposes transmission of an optical signal and its complement at two different wavelengths through free space, to a detector comprising two coils of optical fiber, one for receiving and conducting the signal, and the other for receiving and conducting the signal's complement.

SUMMARY OF THE INVENTION

I have determined that two separate optical fibers are not necessary for transporting differential optical signals, and that only a single fiber may be used instead, thereby eliminating system cost, bulk, and complexity that result from the use of two fibers. This is especially significant for optical backplane buses which comprise a plurality of separate transmission links, and therefore benefit through my invention from an elimination of a plurality of fibers, or alternatively, from a doubling of the number of transmission paths that they can implement in any given bus physical size.

According to my invention, in an optical differential-signal communication arrangement, the optical signal which is representative of an input signal and the complement of the optical signal are both wavelength-division multiplexed onto a single fiber. That is, the optical signal and its complement are generated having different wavelengths, and both signals' wavelengths are transmitted across the single optical fiber. At the other end of this fiber, both signals are received from the single optical fiber, and an output signal is generated from the two received signals, which is a replica of the input signal.

Preferably, tri-stateable optical signal transmitter and receiver are used, wherein input of a control signal to the transmitter results in neither the optical signal nor its complement being transmitted, and wherein the lack of receipt of both the optical signal and its complement results in a control signal being output by the receiver. The two control signals respectively indicate absence of the input and the output signal. The use of tri-stateable optical signal transmitters and receivers facilitates application of the arrangement in multipoint optical communication systems, such as optical backplanes, wherein a plurality of optical signal sources share a communications path on a time-division multiplexed basis.

The optical differential-signal communication arrangement has numerous advantages. True differential transmission of data is realized with only a single fiber, connector, housing, etc. Use of optical instead of metallic conductors eliminates ground noise interference and electromagnetic interference with the optical signal. The common optical path and the use of differential signaling minimize common-mode distortion. The modal dispersion in large, high numerical aperture, fibers becomes less critical to the system, since it acts on both signal components equally. Implementation of the system is simple and uses present technology. No data encoding is necessary for signal detection. D.C. coupling of the signal from the detectors to the receiver output allows a wide range of modulation frequencies to be used.

The differential drive circuit and feed-forward nature of the receiver allow for high speed, low latency, and predictable delay and skew to be achieved. A large variance in signal levels out of the detectors is allowable without degrading the signal quality or receiver sensitivity. Because the output of each detector is compared with the other detector (a relative measurement), a wide range of optical input power levels can be tolerated without any gain control. No periodicity of the waveform is required, so any input pattern is faithfully reproduced at the receiver output. The receiver detection circuitry needs no storage elements, feedback, gain control, A.C. coupling, or edge detection, so the receiver circuitry is very simple, yet sensitivity is improved and achieved over a wide range of optical input power levels, and immunity to pulse-width distortion is enhanced. is enhanced.

Operation of the optical data link as a tristate system makes it possible to distinguish between a logic "0" and no transmission, at any data rate within the link bandpass. If the outputs of receiver detectors are summed together and compared against some minimum signal threshold, it is easy to determine the difference between transmission of a "0" and no transmission at all.

These and other advantages and features of the present invention will become apparent from the following description of an illustrative embodiment of the invention taken together with the drawing.

BRIEF DESCRIPTION OF THE DRAWING

FIG. 4b is a diagram of the magnitude of the signal of FIG. 4a;

FIG. 5a is a diagram of the signal input into the receiver of FIG. 1 by the fiber of FIG. 1 in response to the signal of FIG. 4a;

FIG. 5b is a diagram of the magnitude of the signal of FIG. 5a;

FIG. 6 is a diagram of the signal output by the receiver of FIG. 1 in response to the signal of FIG. 5a;

DETAILED DESCRIPTION

Figure 1:
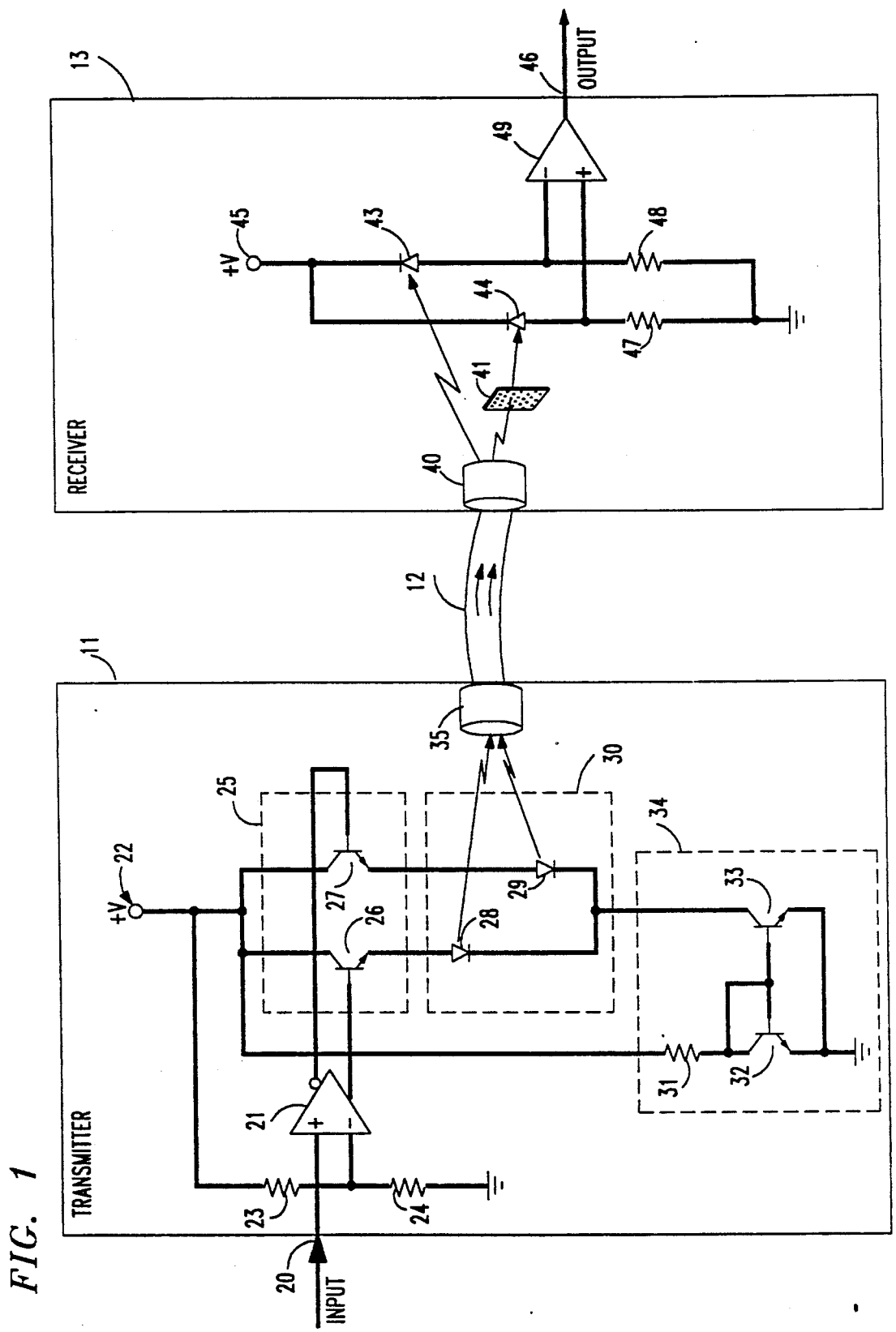
FIG. 1 is a block diagram of a point-to-point optical differential signal transmission system that includes an illustrative embodiment of the invention.

FIG. 1 shows an illustrative point-to-point optical transmission system constructed according to the invention. The system comprises a differential optical signal transmitter (Tx) 11 connected to a differential optical signal receiver (Rx) 13 by a single multi-mode optical fiber 12.

Figure 3:
FIG. 3 is a diagram of an illustrative input signal to the transmitter of FIG. 1.

A digital binary input signal, such as the one illustratively shown in FIG. 3, is applied at an input 20 of transmitter 11 to one input of a voltage threshold device, such as a comparator 21. Comparator 21 is illustratively the Linear Technologies LT1016 high-speed comparator with complementary outputs. The input signal alternates in magnitude—in this example, in amplitude—between a value of zero and one. Illustratively, a magnitude of zero represents a binary logical value of zero, and a magnitude of one represents a binary logical value of one. The converse is, of course, equally possible.

The second input of comparator 21 is biased by a conventional power source (+V) 22, illustratively a +5 V source, and a conventional voltage divider comprising resistors 23 and 24, to cause comparator 21 to detect the binary level—zero or one—of the input signal of FIG. 3. When one output of comparator 21 is asserted, the other output is deasserted, and vice versa.

Figure 2:
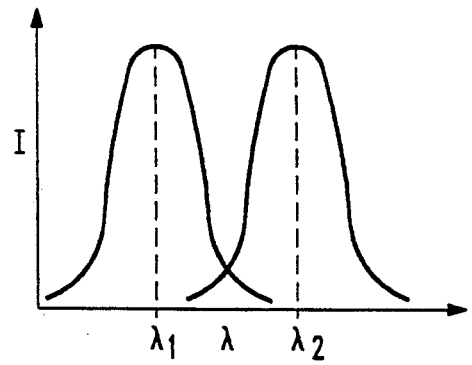
FIG. 2 is an intensity vs. wavelength diagram of the characteristics of the emitters of the transmitter of FIG. 1.

The differential outputs from comparator 21 are fed to inputs of a symmetrical differential amplifier 25. Amplifier 25 illustratively comprises a pair of Motorola 2N5943 high-frequency silicon transistors 26, 27, having their collectors connected to power source 22 and having their bases connected to different outputs of comparator 21. The emitters of transistors 26, 27 are connected to inputs of different light sources, such as a pair of light emitting diodes 28, 29. Each diode 28, 29 outputs a light of different wavelength. Illustratively, diode 28 outputs light of red wavelength $\lambda_1$ and diode 29 outputs light of green wavelength $\lambda_2$. The relative characteristics of diodes 28 and 29 are shown in the intensity (I) vs. wavelength ($\lambda$) graph of FIG. 2. Illustratively, diodes 28, 29 are packaged as a single device 30, such as the Hewlett-Packard HLMP4000 bicolor LED.

The other leads of diodes 28 and 29 are connected to ground through a simple constant-current source 34. Current source 34 consists of a resistor 31 and a pair of matched transistors 32, 33, as is conventional. Transistors 32, 33 are illustratively the Motorola 2N5943 high-frequency silicon transistors. The bases of transistors 32, 33 are connected together, to the collector of transistor 32, and to one lead of resistor 31. The other lead of resistor 31 is connected to power source 22. The collector of transistor 33 is connected to diodes 28 and 29. The emitters of transistors 32 and 33 are connected to ground. Current source 34 regulates the current passing through diodes 28 and 29 and thereby ensures that the magnitude, or amplitude, of light generated by diodes 28 and 29 remains the same.

Depending on the signal level of the input signal of FIG. 3, one or the other output of comparator 21 causes one or the other transistor 26, 27 to drive one or the other diode 28, 29. Hence, when one of the diodes 28, 29 is on and emitting light, the other of the diodes 28, 29 is off and not emitting light, thereby producing the differential optical signals illustratively shown in FIG. 4a. The magnitude of the differential signals shown in FIG.

Figure 4A:
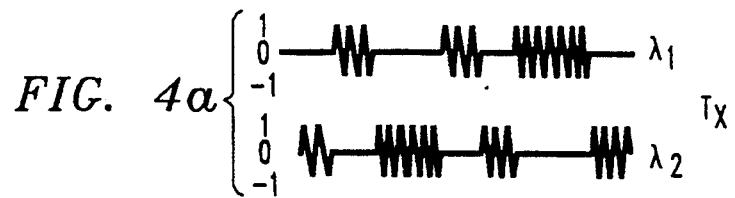
FIG. 4a is a diagram of the signal output by the transmitter of FIG. 1 into the fiber of FIG. 1 in response to the signal of FIG. 3.
Figure 4B:
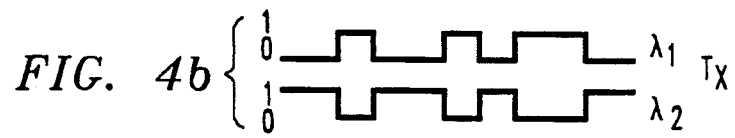

4a are shown in FIG. 4b. As shown, when a diode 28, 29 is on, it produces an optical signal of magnitude, i.e., amplitude, one, and when the diode is off, it produces an optical signal of magnitude zero. A signal magnitude of zero is the absence of the signal in this illustrative example. Modulated in this fashion, light of one wavelength, emitted by one of the diodes 28, 29, represents a binary logical value of "0", while light of the other wavelength, emitted by the other of the diodes 28, 29, represents a binary logical value of "1". The light emitted by diodes 28 and 29 is coupled into the single multimode fiber 12 by an optical lens 35, such as a Newport 0.25 pitch GRIN rod lens.

Figure 5A:
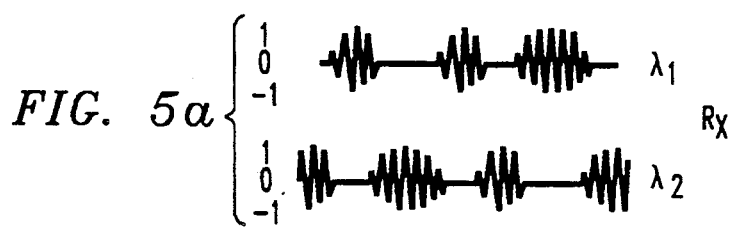
Figure 5B:
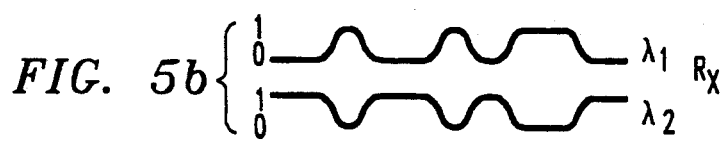

Because of signal dispersion that is inherent in transmission media such as fiber 12, the optical signals of FIG. 4a which enter fiber 12 exit it having the form shown in FIG. 5a. The magnitude of the differential signals shown in FIG. 5a are shown in FIG. 5b. These signals are coupled from fiber 12 to a pair of optical detectors 43, 44 by an optical lens 40, which is illustratively a duplicate of lens 35. Illustratively, both detectors 43, 44 are identical, such as the Motorola MRD500 silicon photodiode detectors with integral lenses. They are each made relatively more sensitive to a different one of the wavelengths $\lambda_1$ and $\lambda_2$ by the use of a light filter 41, which is placed between one of them and lens 40. Illustratively, a red filter 41 is placed before detector 44, and the light energy directed at detector 44 is made greater than that incident on unfiltered detector 43 to compensate for the effect of filter 41. Illustratively, ⅔ of this total light energy is directed at the filtered detector. However, in order to establish this wavelength differentiation, other techniques may be used, such as placement of a different color filter (red and green) before each detector 43, 44, or spatial separation by wavelength of the incoming optical signal, or use of detectors made from different detector materials that make them sensitive to different wavelengths and insensitive to other wavelengths.

Figure 6:

Detectors 43 and 44 are powered by a power source (+V) 45, illustratively a +20 V source. Light impinging on detectors 43 and 44 causes relatively more current to flow through one or the other of them at any one time, depending upon the impinging light's wavelength. The currents output by detectors 43 and 44 are coupled to different inputs of a high-gain differential-current amplifier 49. Illustratively, amplifier 49 is a Texas Instruments UA741 operational amplifier. The inputs of amplifier 49 are biased to ground potential by a pair of resistors 47, 48. Amplifier 49 recovers the original digital binary signal, and couples it to an output 46 of receiver 13. The signal output of amplifier 49 is shown in FIG. 6.

Figure 7:
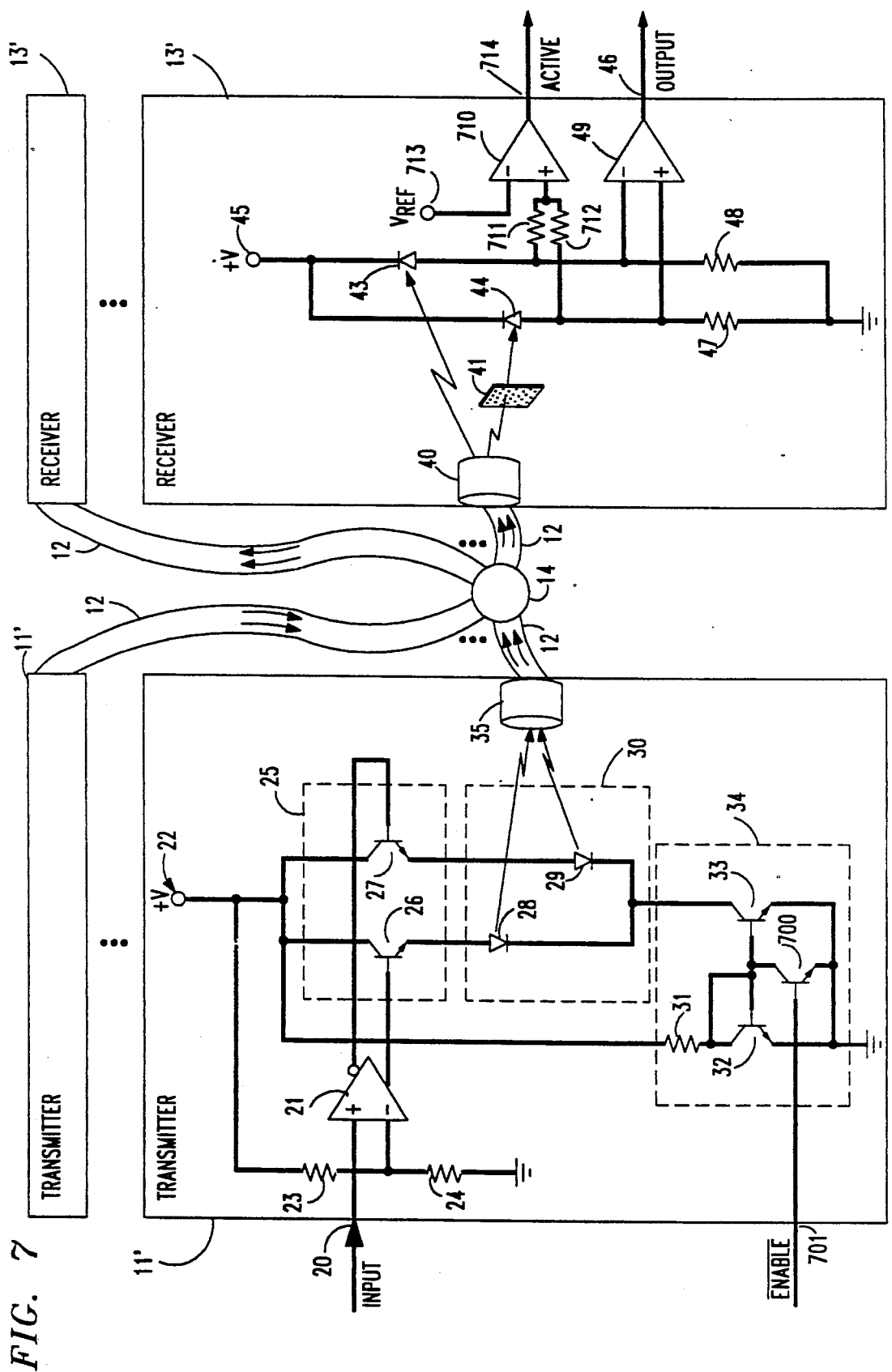
FIG. 7 is a block diagram of a multipoint optical differential signal transmission system that includes an illustrative embodiment of the invention.

FIG. 7 shows an alternative embodiment of an optical differential transmission system constructed according to the invention. This illustrative embodiment is particularly suited to serve as a multipoint transmission system. Such a system may constitute one of the "leads" or paths of an optical backplane, for example. The same numerals are used in FIGS. 1 and 7 to designate elements that are common to both figures.

The system of FIG. 7 comprises a plurality of transmitters 11' connected to a plurality of receivers 13' through a conventional optical star coupler 14. Each transmitter 11' and each receiver 13' is connected to coupler 14 by its own single multimode fiber 12. Coupler 14 combines light signals incoming from all transmitters 11' into a single combined signal, and sends the combined signal to all receivers 13'. All transmitters 11' are identical in this example, as are all receivers 13'.

An alternative arrangement uses a single optical fiber 12 having a plurality of optical taps, one for each transmitter 11' and receiver 13', in place of the star coupler and plurality of fibers.

Transmitters 11' of FIG. 7 duplicate transmitter 11 of FIG. 1, with one addition that gives each transmitter 11' a tri-stateable optical output. That is, a transmitter 11' can place its optical output in a logical "1" or a logical "0" state like transmitter 11 of FIG. 1, or in a "no output" state wherein the levels of both the signal and its complement are the same, i.e., unasserted. A transistor 700 is added to current source 34 to enable the turning on and off of current source 34. The collector of transistor 700 is connected to the bases of transistors 32 and 338 and the emitter of transistor 700 is connected to ground. The base of transistor 700 is connected at an input 701 of transmitter 11' to a source of an $\overline{\text{ENABLE}}$ signal. The $\overline{\text{ENABLE}}$ signal is active low: when it is absent, it indicates that a valid input signal is present at input 20, and transmitter 11' operates like transmitter 11 of FIG. 1, as described above. When $\overline{\text{ENABLE}}$ signal is high, it indicates that a valid input signal is absent at input 20, and current source 34 is disabled, and thereby both light emitting diodes 28 and 29 are also disabled. This produces a third output state of transmitter 11' in which transmitter 11' is not outputting any light into its connected fiber 12. Typically, only one of the transmitters 11' will have its $\overline{\text{ENABLE}}$ signal low at any one time, while the other transmitters 11' will have their $\overline{\text{ENABLE}}$ signals high. Consequently, only one transmitter 11' will transmit at any one time.

Receivers 13' of FIG. 7 duplicate receiver 13 of FIG. 1, with one addition that enables each receiver 13' to detect the third of the tri-state outputs of transmitters 11' wherein no transmitter 11' is transmitting and all fibers 12 are idle. A second comparator 714 is added to each receiver 13'. One input of comparator 714 is coupled by resistors 711 and 712 to the inputs of comparator 49, while the second input of comparator 714 is connected to a voltage reference source ($V_{REF}$)713. The reference voltage is set at a level that enables the comparator 710 to detect output from (i.e., optical signal detection by) either one of diodes 43 and 44. Upon detecting output from either one of diodes 43 and 44, comparator 710 generates an ACTIVE signal at an output 714 of receiver 13'. The ACTIVE signal is active high: when the ACTIVE signal is high or present, it indicates that output of comparator 49 is valid, i.e., that a valid output signal is present at output 46; when the ACTIVE signal is low or absent, it indicates that output of comparator 49 is invalid and no signals are being received by receiver 13'.

Figure 8:
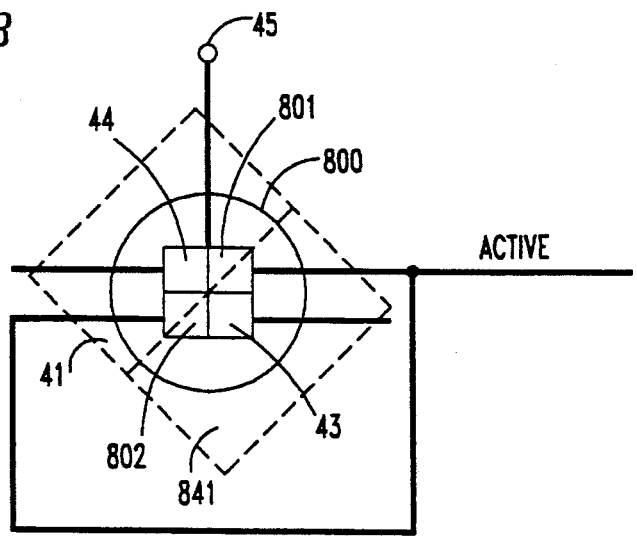
FIG. 8 is a diagram of an alternative implementation of the ACTIVE-signal generation circuitry of the system of FIG. 7.
Figure 9:
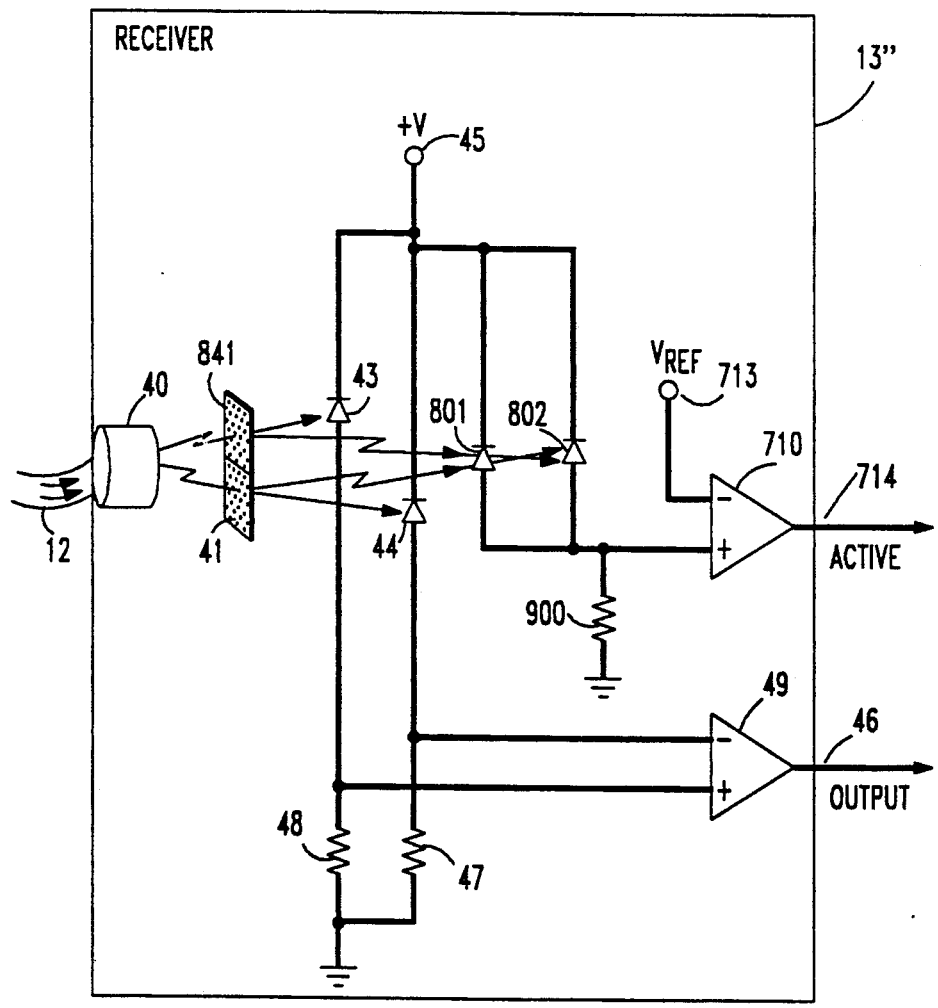
FIG. 9 is a block diagram of an optical differential signal receiver that includes the circuitry of FIG. 8.

An alternative implementation of received and ACTIVE signal detection circuitry is shown in FIG. 8. It makes use of a quadrant photodiode 800, such as the Centronic Inc. CD33H-4D quadrant PIN device, which is a single package of four independent photodiodes. Each of the photodiodes has its own output lead, and the four photodiodes share a single power input lead. The power input lead is connected to power source 45. Two of the four diodes serve as diodes 43 and 44, and their output leads are connected as shown in FIG. 7. The remaining two diodes, designated as 801 and 802 in FIG. 8, serve as the ACTIVE signal detection circuit. Overlaid across quadrant photodiode 800 are a pair of light color filters 41 and 841. As in FIG. 7, filter 41 is a red filter that overlays diode 44. Filter 41 also overlays half of each diode 801 and 802. Filter 841 is a green filter, and it overlays diode 43 and the other half of each diode 801 and 802. Illustratively, filters 41 and 841 may be painted onto the face of quadrant photodiode 800. As a consequence of being half-overlaid with each filter 41 and 841, diodes 801 and 802 detect incoming light of both colors, red and green, and each generates an output signal upon detecting light of either color. The output leads of diodes 801 and 802 are tied together to form the detected signal input to comparator 710. A receiver 13" that makes use of the circuitry of FIG. 8 is shown in FIG. 9. The numerals that were used in FIGS. 7 and 8 are used in FIG. 9 to designate like elements. A resistor 900 biases the detected signal output of diodes 801 and 802 to ground.

Of course, it should be understood that various changes and modifications may be made to the above-described illustrative embodiment of the invention. For example, instead of a binary input signal, a continuously-variable input signal may be used to drive the transmitter LED's, and on the receiver side a linear amplifier may be used to recover the original signal. Or, the couplers of the differential signals to and from the transmission fibers may each comprise a pair of fiber stubs fused (merged) at the output or the input ends, respectively. Such changes and modifications can be made without departing from the spirit and the scope of the invention. It is therefore intended that such changes and modifications be covered by the following claims.

What is claimed is:

1. An arrangement for communicating via differential optical signals comprising:
a plurality of transmitters, each transmitter including
first means responsive to receipt of an input signal representing a first binary value for generating a first optical signal having a first wavelength while refraining from generating a second optical signal having a second wavelength to represent the first binary value, and responsive to receipt of an input signal representing a second binary value for generating the second optical signal having the second wavelength while refraining from generating the first optical signal having the first wavelength to represent the second binary value, the first means further responsive to receipt of a control signal indicative of absence of the input signals for generating neither the first nor the second optical signal, and
second means connected to the first means for transmitting both the generated first and second optical signals on a single optical fiber;
at least one optical fiber each connected to at least one second means; and
at least one receiver, each receiver including
third means connected to the at least one optical fiber and for receiving any transmitted first and second optical signals on a single optical fiber, and
fourth means connected to the third means, responsive to receipt of the first optical signal in the absence of receipt of the second optical signal for generating an output signal representing the first binary value, and responsive to receipt of the second optical signal in the absence of receipt of the first optical signal for generating an output signal representing the second binary value, the fourth means further responsive to absence of receipt of both the first and second optical signals for generating a control signal indicative of absence of the output signals.

2. The arrangement of claim 1 wherein
the generated and transmitted first and second optical signals each have a power magnitude; and
the fourth means comprise
means responsive to receipt of the transmitted optical signals for comparing simultaneous power magnitudes of the received first and second optical signals, and
means cooperative with the comparing means for generating the output signal representing the first binary value when the power magnitude of the received first optical signal is greater than the power magnitude of the received second optical signal, and generating the output signal representing the second binary value when the power magnitude of the received second optical signal is greater than the power magnitude of the received first optical signal.

3. The arrangement of claim 1 wherein
the at least one optical fiber comprises:
a plurality of first optical fiber segments, each first segment connected to a different second means;
at least one second optical fiber segment, each second segment connected to a different third means; and
means connecting the first segments with the second segments for coupling the optical signals from all of the first segments to all of the second segments.

4. A method of communicating via differential optical signals, comprising the steps of:
in response to receipt at any one of a plurality of locations of an input signal representing a first binary value, generating at the receiving location a first optical signal having a first wavelength while refraining from generating at the receiving location a second optical signal having a second wavelength to represent the first binary value;
transmitting the first optical signal from the receiving location on an optical fiber;
in response to receipt at any one of the plurality of locations of an input signal representing a second binary value, generating at the receiving location the second optical signal having the second wavelength while refraining from generating at the receiving location the first optical signal having the first wavelength to represent the second binary value;
transmitting the second optical signal from the receiving location on the same optical fiber on which any generated first optical signal is transmitted from the receiving location;
in response to receipt at any one of the plurality of locations of a control signal indicative of absence of the input signals, generating neither the first nor the second optical signal at the receiving location;
receiving any transmitted first and second optical signals on a single optical fiber at each one of one or more receiving locations;
in response to receipt of the first optical signal in the absence of receipt of the second optical signal at a receiving location, generating at the receiving location an output signal representing the first binary value;
in response to receipt of the second optical signal in the absence of receipt of the first optical signal at a receiving location, generating at the receiving location an output signal representing the second binary value; and in response to receipt of neither the first nor the second optical signal at a receiving location, generating at the receiving location a control signal indicative of absence of the output signals.

5. The method of claim 4 wherein the generated and transmitted first and second optical signals each have a power magnitude;

the step of receiving comprises the step of in response to receipt of any transmitted optical signals, comparing simultaneous power magnitudes of the received first and second optical signals;

the step of generating an output signal representing the first binary value comprises the step of generating the output signal representing the first binary value when the power magnitude of the received first optical signal is greater than the power magnitude of the received second optical signal; and the step of generating an output signal representing the second binary value comprises the step of generating the output signal representing the second binary value when the power magnitude of the received second optical signal is greater than the power magnitude of the received first optical signal.

* * * * *